United States Patent [19]
Kominsky

[11] Patent Number: 5,013,154
[45] Date of Patent: May 7, 1991

[54] SYSTEM FOR REMOTELY READING AN ANALOG METER

[75] Inventor: Richard A. Kominsky, Westfield, Mass.

[73] Assignee: K and M Electronics, Inc., West Springfield, Mass.

[21] Appl. No.: 422,133

[22] Filed: Oct. 16, 1989

[51] Int. Cl.$^5$ ........................ G01B 11/14; H04N 7/18
[52] U.S. Cl. ........................ 356/375; 358/107
[58] Field of Search ................ 356/375; 358/107, 166; 382/8, 48, 50

[56] References Cited

U.S. PATENT DOCUMENTS

| | | | |
|---|---|---|---|
| 4,492,472 | 1/1985 | Asano et al. | 356/394 |
| 4,581,762 | 4/1986 | Lapidus et al. | 382/8 |
| 4,680,704 | 7/1987 | Konicek et al. | 250/231.15 |

OTHER PUBLICATIONS

Build the Micro D-Cam Solid State Video Camera, Ciarcia, Byte publications, Sep. 1983, pp. 21-33, Part I; Oct. 1983, pp. 67-86, Part II.

*Primary Examiner*—F. L. Evans
*Assistant Examiner*—K. P. Hantis
*Attorney, Agent, or Firm*—Lahive & Cockfield

[57] ABSTRACT

A system is disclosed for remotely reading out an analog meter having a movable pointer overlying and being mobile over a stationary scale. The pointer is characterized by a first optical reflectivity (R1), and the scale is characterized by a second optical reflectivity (R2). The system comprises an image generator and a detector. The image generator generates an image signal representative of the optical reflectivity of a composite image of the pointer overlying the scale. The detector processes the image signal to generate a pointer position signal representative of the relative position of the pointer with respect to the scale.

5 Claims, 2 Drawing Sheets

SYSTEM FOR REMOTELY READING AN ANALOG METER

BACKGROUND OF THE INVENTION

This invention relates to parameter measuring systems. The invention more particularly relates to automated systems for remotely reading out analog meters.

Parameter measuring systems allow users to gain information representative of a sensed parameter. The sensed parameters may be voltage, current, fluidic flow or other quantities to be measured. The read-out device employed in a parameter measuring systems may be, for example, a digital meter or an analog meter.

Many conventional automated parameter measuring systems employ digital meters. Digital meters generally allow users to visually read information representative of the sensed parameter by digitizing the sensed parameter and producing a numerical display representative of the digitized information.

Many digital meters include outputs allowing the digitized information to be transmitted and remotely read. A parameter measuring system for remotely reading digital meters eliminates the need for a user to read the information at the meter (in a possibly hazardous environment), and enter the information into an information processing system, such as a computer.

For parameter sensing systems utilizing analog meters, the analog meters generally include a movable pointer disposed over a stationary scale. The needle is adapted to be deflected in proportion to a sensed parameter, such as electric charge, voltage, or current. Analog meters are designed specifically for users to visually read information representative of a sensed parameter.

Most analog meters either provide no output other than the visual display or provide an analog output signal representative of the displayed information. In the latter case, additional circuitry is usually required to convert the analog signal to a form suitable for use by an information system such as a computer. Often the analog signal also cannot be transmitted any significant distance without additional drive circuitry.

By including this additional circuitry, one could construct an automated system for remotely reading out analog meters which provide analog output signals. However, a prior art analog meter which provides no such output signals cannot currently be used to construct an automated system for remotely reading out data from the analog meter.

In order to accommodate automated systems, some analog meters may be replaced by more expensive digital meters having similar input characteristics, but which also provide digital output signals. However, certain analog meters cannot be so replaced because of the technique they employ for converting a sensed parameter into displayed information representative of the sensed parameter.

The conversion technique employed, for example, in certain voltmeters is electrostatics. Electrostatic voltmeters operate on the principle that like charges repel. This principle is used in repelling a movable indicator, which is under tension from a spring, away from a stationary reference point. The movable indicator is used to display information representative of the sensed voltage, since the amount of indicator movement is directly dependent on the applied voltage signal.

An important characteristic of electrostatic voltmeters is that they have very high input impedances. As a consequence of the high input impedance, the voltage signal being measured is not degraded by the presence of the voltmeter. It is also important that such voltmeters respond quickly to a sensed voltage signal. Electrostatic voltmeters respond very quickly because they present an input impedance of effectively infinite resistance and a very small capacitance.

There are some voltage measurements which must be performed by voltmeters with a very high input impedance. There are also some current measurements which must be performed by ammeters with a very low input impedance. In both cases above this is because the precise value of the input signal must be maintained with as little degradation as possible.

Certain high voltage power supplies generally have very high output impedances because they provide very little current. Such power supplies might be used to drive a flashlamp, or might be used for an image converter or intensifier tube. Performing voltage measurements on these power supplies is difficult because of this high output impedance. For example, to obtain less than 0.1 percent error, the measuring device must have an input resistance that is 100 times greater than the output resistance of the high voltage power supply being tested.

For all of these examples, operator-read analog meters have been used in the prior art to perform such measurements. It is an object of the present invention to provide a parameter measuring system for remotely reading out analog meters. Certain measurements, such as measuring the voltage of a high voltage-low current power supply, cannot be performed utilizing conventional techniques.

It is another object to provide an automated system for remotely reading out analog meters, eliminating the requirement of having a user enter the information into an information system.

SUMMARY OF THE INVENTION

The invention encompasses a system for remotely reading out an analog meter. An analog meter is characterized as having a movable pointer overlying, and being mobile over, a stationary scale, where the scale and pointer are characterized by differing optical reflectivities.

The system includes an image generator for generating an image signal representative of the optical reflectivity along a path of interest of the composite image of the pointer overlying the scale. A detector processes the image signal to generate a pointer position signal representative of the relative position of the pointer with respect to the scale.

The imaging generator may include a digitizer, such as a digital television camera, for generating a multiple element array of image data corresponding to the image signal. The value of each element of the array represents the optical reflectivity of a correspondingly positioned pixel along the path of interest in the composite image of the pointer overlying the scale. The value may be a binary value or some other coded value representative of the pixel reflectivity.

The detector may include a generator for generating a first reflectivity change signal, a summer network for summing the reflectivity change signal with a temporally offset (i.e., delayed), inverted version of itself, and a generator for generating a pointer position signal from the result of the summing operation. The first reflectivity change signal is representative of the change in optical reflectivity between R1 and R2 of the various pixels along the path of interest. The temporally offset, inverted form of the reflectivity change signal is temporally offset from that signal by a time corresponding to the width of the pointer along the path of interest. When the reflectivity change signal is combined with the delayed, inverted version of itself by the summer network, a resultant pointer position signal is provided, which is indicitive of the position of the pointer relative to the scale. This signal processing may be achieved by software within a digital computer, or, alternatively, with analog circuitry.

The system may further comprise a look-up table (LUT) memory for storing output values corresponding to respective values for the pointer position signal. A generator responsive to the pointer position signal generates an output signal representative of the output value corresponding to the pointer position signal in the LUT memory.

In a preferred form of the invention employing a digital computer and utilizing an array of data values corresponding to pixel locations in the composite image of the pointer and scale, a digital pixel signal representative of the optical reflectivity of pixels along the path of interest is added to a second digital pixel signal representative of a temporally offset inverse of the first digital pixel signal (delayed by the number of pixels corresponding to the pointer width D) to produce pointer position signal. These digital pixel signals may be, for example, representative of one of 256 gray levels between a first reflectivity R1 and a second reflectivity R2. The first and second digital pixel signals are summed using the addition operation.

The pointer position signal is used in connection with a look-up table memory which produces an output signal. The look-up table stores values representative of possible positions of needle along the path of interest. In response to the pointer position signal the computer identifies a stored value in the LUT memory which corresponds to the pointer position signal. That is reported as output signal.

With this configuration, an analog meter may be remotely read by a physically decoupled (although optically coupled by the image generator) system.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
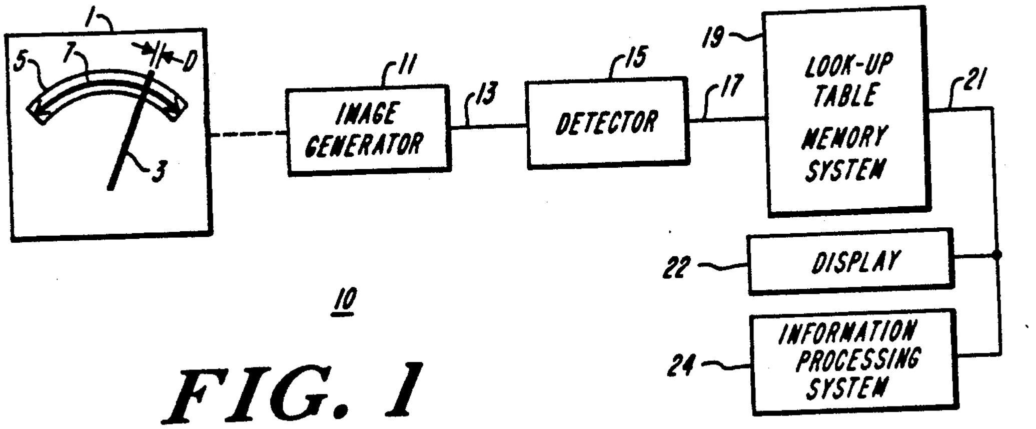
FIG. 1 is a block diagram of the system in accordance with a preferred embodiment of the present invention.

FIG. 1 shows a parameter measurement system 10 in accordance with the present invention. In that system, an analog meter 1 is monitored by image generator 11 and produces image signal on a signal line 13. Detector 15 receives image signal from line 13 and produces pointer position signal on line 17. Look-up table (LUT) memory system 19 converts the pointer position signal into output signal on line 21 which is connected to a display 22, and to an information processing system 24.

In the illustrated embodiments, the analog meter 1 is a Type ESD4 electrostatic voltmeter (manufactured by Sensitive Research, Mount Vernon, N.Y.) in the present embodiment. The electrostatic voltmeter includes movable pointer needle (or pointer) 3 overlying and being mobile over stationary planar scale 5. The pointer 3 has a first optical reflectivity R1 (black) and the underlying scale 5 has a second optical reflectivity R2 (white). Pointer 3 moves in the direction of path of interest 7 across scale 5, a distance representative of the voltage sensed at the input to the analog meter. Needle 3 on meter 1 has a predetermined width D along the path of interest. In alternate embodiments, the meter may be an "edge meter," where the scale extends circumforentially on a cylindrical surface, and the pointer tracks along a similar circumferential path.

A Type CT3800 video television camera (manufactured by Computar, distributed by Metrobyte Corporation, Taunton, Mass.) in image generator 11 is used to generate the image signal which is representative of the composite image of the meter 3 overlying the scale 5. The image signal is converted to a digitized image signal by a video-to-digital converter circuit (model MV-1 Video Acquisition System (256 level)) in generator 11. The digitized image signal has the form of an array of values representing image pixels in a rectangular array, where each of the values in the array is representative of the optical reflectivity of a correspondingly positioned region of the face of the meter 1 as overlaid by the pointer 3. The detector 15 processes the image assay data and produces the pointer position which is representative of the location of the pointer 3 with respect to the scale 5.

In the preferred embodiment, the video camera provides the image data array to a digital computer (an IBM Type AT Personal Computer) which is programmed to process that data array and generate the pointer position signal. That computer then compares the pointer position signal to stored values in a look-up table in the LUT memory system 19 to determine the corresponding output signal that is applied to line 21. The output signal may then be displayed (at display 22) or further processed at information processing system 24. Accordingly, in this embodiment, the computer effectively performs the function of a portion of generator 11, detector K, and LUT memory system 19.

In various embodiments, the meter being monitored by the image generator may have different forms. In the simplest case the black needle may overlie a uniformly illuminated planar scale, as described above, where the pointer corresponds to the darkest (relative) values in the image data array. However, the image data may not always be that straight forward. For example, in the case of an edge meter, the scale may vary in sensed brightness due to curvature in the face of meter 1 and/or due to varying amounts of light in the environment. In such cases, the image data corresponding to the pointer may have an intermediate value between the max/min values from the scale (i.e., between its brightest and darkest points).

Figure 2A:
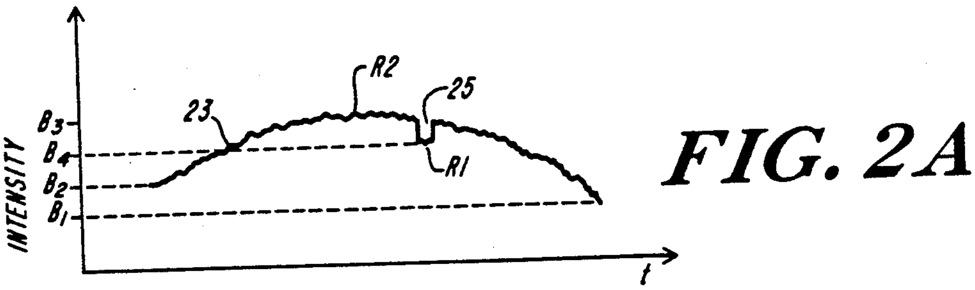
FIGS. 2A through 2C are illustrations of an analog image signal before and after both a high frequency filter and a low frequency filter in accordance with a preferred embodiment of the present invention.

By way of example, FIG. 2A shows an exemplary analog-detected illumination intensity signal 23 as a function of time (corresponding to distance from left to right along the path of interest 7 in FIG. 1). The reflectivity of pointer 3 (at the "notch" in signal 23) is characterized by value B4. In that figure, the varying reflectivity of scale 5 is characterized by a noisy (high-frequency) curve having minimum values B1 and B2 and a peak value B3. The illustrated illumination intensity "notch" 25 is caused by the relative dark pointer 3. In that illustration, pointer 3 is characterized by brightness B4 which is between B3 and B1. With this illumination intensity, an algorithm which simply located the darkest pixel would fail to correctly determine the position of pointer 3, but rather would choose B1 as the darkest pixel and erroneously report that pointer 3 was located at B1 corresponding to a full scale.

The problem of varying brightness of the background of meter 1 due to variations in reflection of light from the face of meter 1 (such as may be due to curvature in the face of meter 1) is thus illustrated in FIG. 2A. To overcome this problem in the preferred embodiment, a filter algorithm is introduced which is designed to produce maximum output when encountering a change in the image data which most likely is caused by the meter pointer. Slow changes in background intensity over the surface of the meter are filtered out, as well as rapid changes in intensity caused by imperfections in the video camera.

In the present embodiment, such a filter algorithm is implemented using the digital computer programmed to operate on an image data array representative of signal 23. Then the filtered data is processed to permit identification of the pointers.

To perform these steps, a succession of data values from the image data array are digitally filtered to remove high and low frequency components. Then the values are combined in an invert-shift (by the number of values corresponding to the width of the pointer) add step and the most negative value is defined as being representative of the pointer location along path 7. Appendix A shows a printout of an exemplary computer program for an IBM type AT Personal Computer which implements the filter and pointer detection process where D equals five pixels.

In another embodiment of the invention, such an algorithm could be implemented with an analog circuit which filters an analog signal representative of signal 23 and performs a corresponding pointer signal generation step. Those skilled in the art will appreciate that such an analog circuit could be built to perform the described filtering without parting from the intent or scope of the invention. The analog filter embodiment removes portions of illumination intensity signal 23 which are of frequencies higher and frequencies lower than the frequency of notch 25, and then performs a delay and add operation to generate a signal from which the pointer position signal may readily be generated. For illustrative purposes the following describes an analog processing for the exemplary analog illumination intensity signal 23.

Figure 2B:
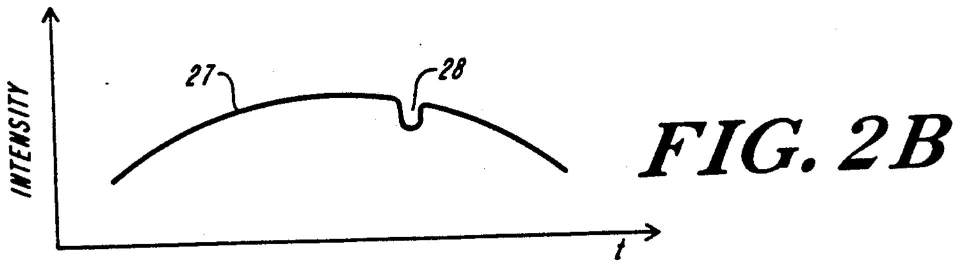

The illumination intensity signal 23 is first passed through a high frequency filter to remove signal noise (such as may be due to noise generated by the video camera) and to leave only middle and low frequency components. FIG. 2B shows a high-frequency filtered signal 27 corresponding to signal 23 after the high frequency components have been removed. FIG. 2B illustrates that notch 25 is preserved as notch 28.

Figure 2C:
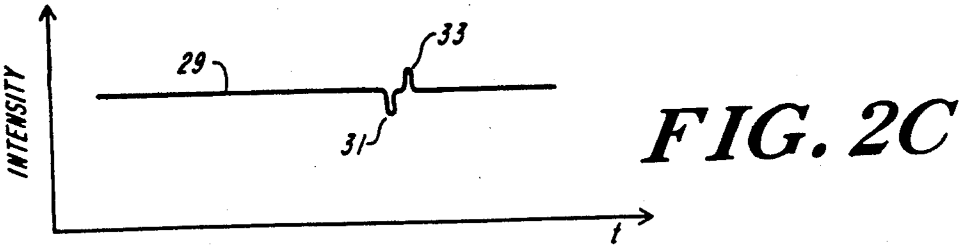

Signal 27 is then applied to a low frequency filter (differentiator) network to remove the slowly varying components of signal 27, such as may be due to the physical curve of the scale, or to non-uniform illumination on the scale 5. FIG. 2C depicts fully filtered signal 29 without the slowly varying curved component of signal 27. In signal 29, a negative signal spike 31 results from the fall at the start of notch 28 and positive signal spike 33 results from the rise of notch 28. Notches 31 and 33 represent the left and right edges of pointer 3.

The fully filtered signal 29 is then applied to a summing network which generates a signal from which the location of the pointer 3 is readily determined. The operation of the analog summing network is discussed below with reference to FIGS. 3A-3D.

Figure 3A:
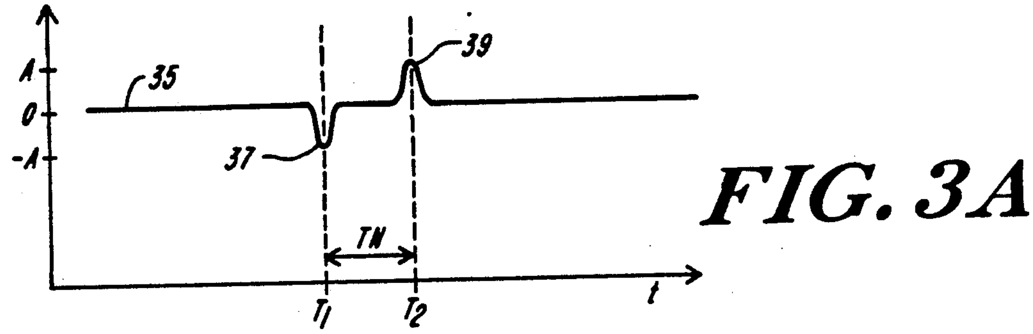
FIGS. 3A through 3D are illustrations of the process of generating the sum of the first reflectivity change signal and the temporally offset inverted reflectivity change signal in accordance with a preferred embodiment of the present invention.

FIG. 3A illustrates first reflectivity change signal 35 resulting from fully filtered signal 29 referenced so that zero reflectivity change corresponds to a horizontal line. The first reflectivity change signal peaks 37 and 39 at times T1 and T2 correspond to fully filtered signal peaks 31 and 33. The time difference TN (equal to T2−Tl) corresponds to the width D of pointer 3 along the path 7.

Figure 3B:
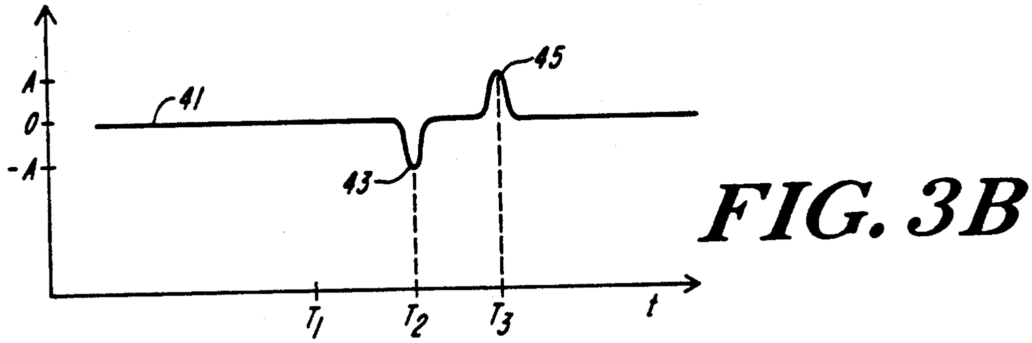

The summing network generates a second reflectivity signal 41 which is similar to but temporally offset (by TN), i.e., the time corresponding to the scan time across the width D of pointer 3 along 7) from the first reflectivity change signal 35. The second reflectivity change signal 41 is shown in FIG. 3B. Peaks 43 and 45 in the second reflectivity change signal correspond to peaks 37 and 39 in the first reflectivity change signal.

Figure 3C:
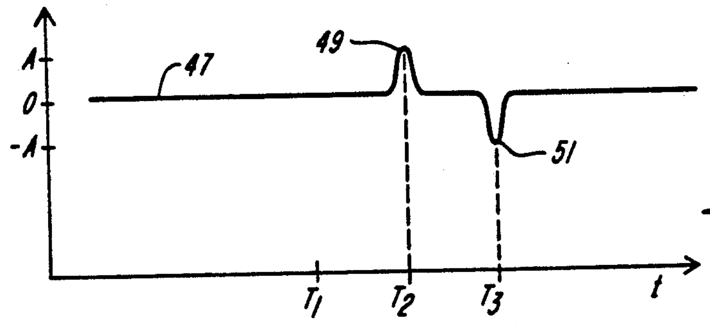

The summing network next inverts temporally offset reflectivity change signal 41 to produce inverted temporally offset reflectivity change signal 47 as shown in FIG. 3C.

Figure 3D:
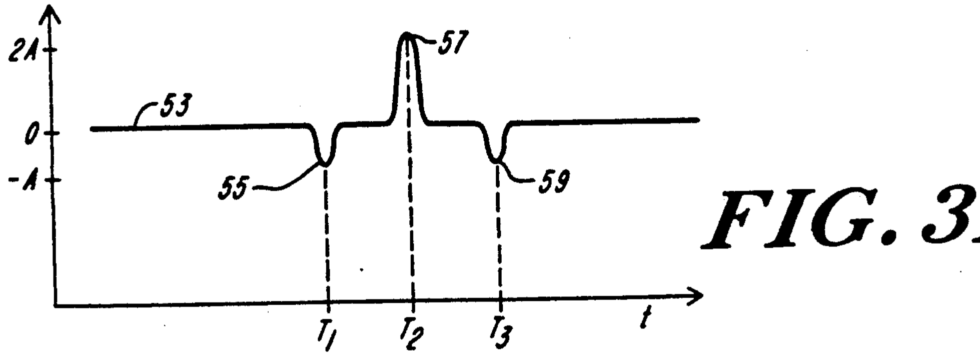

Finally, the summing network adds the first reflectivity change signal 35 to the inverted, offset reflectivity change signal 47, to produce final reflectivity change signal 53 as shown in FIG. 3D, including single height signal negative-going peaks 55 and 59 and a double height positive-going peak 57. The double height peak 57 is representative of the position of notch 25 in signal 23 (and thus pointer 3 over scale 5) and is the detected to provide the pointer position signal 17.

A person skilled in the art would appreciate that there are many uses and benefits of the present invention. For example, no physical connection is necessary between the analog meter and an information system such as a computer. This optical isolation protects the inventive system from high voltage spikes which could be caused by transients common to high voltage circuits. These spikes could cause computer errors or destructive failures to occur. An optically transparent electric shield (transparent conductive film) could also be placed between the high voltage analog meter and the system for remotely reading the analog meter.

The present invention could also be used in applications where it is possible for direct connection between an analog meter and a system for remotely reading out the analog meter, but such a direct connection is not desirable. An example might be a system for remotely reading a fluid flow meter in a toxic, corrosive, explosive, or high radiation environment.

The invention can be embodied in other specific forms without departing from the spirit or essential characteristics thereof. The described embodiments of the invention are to be considered in all respects as illustrative and not restrictive. The scope of the invention is indicated by the appended claims rather than the foregoing description, and all changes which come within the meaning and range of equivalency of the claims are therefore intended to be embraced therein.

Appendix A.

```
/***************************************************************************/
/*notes:FOR 300 VOLT ELECTROSTATIC (CAL_DATA.1)                          */
/*         START = 80 , END = 430 , YOFSET = 400 , RADIUS = 280        */
/*      FOR 1500 VOLT ELECTROSTATIC (CAL_DATA.2)                         */
/*         START = 62 , END = 450 , YOFFSET = 380 , RADIUS = 258        */
/*                                                                        */


short int arc()

{
extern short int a[] ;          /* caldata array */
short int  nmin      ;
short int row, col;      /*!used by mv_ routines for defining row,col */
double ndouble, nsq, radsq, radius, yofset;          /* calc arc routine */
unsigned char far *pixptr;         /*!used by mv_ routines for pixel manipulation
*/
short int n ;                   /* loop counter variable */

short int start = 62 ;          /* indicator to first valid point on meter face */
short int end = 450  ;          /* indicator to last valid point on meter face  */

float x, xmin         ;
extern float arf[520];          /* used to contain a row of video data */
float out0, out1, in0, in1;     /* used in video filter */

unsigned long td = 13000;       /* time delay routine */
unsigned long time ;            /* time delay routine */

     mv_channel(2)    ; /* select channel 2 on multiplexer */
         for (time=0; time <= 5*td ; time++ );
/*   mv_view(2)       ;     display live source */
                        /* note: 0-image 1-graphics 2-live */
     mv_frameacq(0)   ; /* aquire image and place it in bank 0 (image bank)  */
     mv_view(0)       ; /*display acquired image*/

      /* READ ARC */
      yofset = 380  ; /* yofset moves eq from 1st to 3rd quadrant */
      radius = 258   ; /* defines radius of arc */
      radsq = radius * radius;

      for ( n = 0 ; n <= 511 ; n++ )
      {  col =  n ;
         ndouble = (double)(n - 256);
         nsq = ndouble * ndouble;
         row = (short)( -( sqrt( radsq - nsq ) - yofset + .5 )); /* calculate r
*/

     mv_readpix (0,row,col,pixptr);
     arf[n] = (float)( *pixptr );
 }

 /* REMOVE LOW FREQ COMPONENT */
 out0 = 0.0       ; /* don't want an initial spike */;
 in0 = arf[start];
 for (n = start   ;  n <= 511 ; n++ )
 {    in1=in0      ;
      out1=out0    ;
      in0=  arf[n];
      out0= (float)( .8581552 * (in0 - in1)) + (float)(.7304027 * out1 );
      arf[n] = out0;
 }
```

```
    /* REMOVE HIGH FREQUENCY COMPONENT */
    out0 = 0.0 ; /* don't want an initial spike */;
    in0 = arf[start] ;
    for (n = start  ;  n <= 511 ; n++ )
    {   out1=out0  ;
        in0=  arf[n];
        out0= (float)( .964326 * in0 ) + (float)(.035674 * out1 );
        arf[n] = out0;
    }
    /* INVERT, SHIFT, and ADD */
    for ( n = 0 ;  n <= 504 ; n++ )      /*can't grab invalid values >511*/
      arf[n] = arf[n]+arf[n+1]+arf[n+2] - arf[(n+5)]-arf[n+6]-arf[n+7];

    /* FIND MOST NEGATIVE NUMBER */
    xmin = 255 ;
    nmin = -1  ;
    for ( n= start ; n <= end ; n++ )
    {
        x = arf[n];
        for ( ; x < xmin ; )      /* search for blackest picture */
        {     xmin = x ;          /* xmin is blackest level */
              nmin = n ;          /* nmin is pixel number of blackest pixel */
        }
    }

    /* PAINT MARKER ON SCREEN */
    for ( n = 10 ; n <= 200 ; n++ )
    {     row = n     ;
          col = nmin ;
          mv_writepix (0,row,col,0)    ;
    }

    for ( n = start ; n <= end ; n++ )
    {   col =  n    ;
        ndouble = (double)( n - 256 );
        nsq = ndouble * ndouble        ;
        row = (short)( -(sqrt( radsq - nsq ) - yofset + .5));
        mv_writepix (0,row,col,0)      ;
    }

    nmin = a[nmin] ;               /*  convert from pixel to voltage */

return(nmin);
}

/*********************************************************************/

short int met()
{
  extern short int m[];               /* caldata array */
  extern unsigned char archr[520];   /* video line data storage array */
  extern float arf[520]   ;          /*  video processing array */
  short int n              ;      /* misc loop counter variable */

  short int start = 40 ;       /* search starts here */
  short int end = 490  ;       /* 502 max (actual search is 7 more than this) */
  short int row = 186  ;       /* this row and next row are the ones searched */

  float out0, out1, in0, in1 ; /* used in video filter */

  float x, xmin        ;       /* used in find blackest pixel loop */
  short int nmin =-1   ;       /* dummy starting value             */

  unsigned long td = 13000;     /* time delay routine */
  unsigned long time ;          /* time delay routine */

      mv_channel(3)    ;       /* select multiplexer channel 3 */
          for (time=0; time <= 5*td ; time++ );
   /* mv_view(2)       ;         display live source*/
                               /*note: 0-image 1-graphics 2-live */
      mv_frameacq(0);    /* aquire image and place it in bank 0 (image bank)   */
      mv_view(0)       ;       /*display acquired image*/
```

```
    mv_readrow(0,row,archr);     /*   read a row */
    for (n=0; n <= 511 ; n++)
        arf[n] = (float)( archr[n] );
    mv_readrow(0,(row+1),archr);  /* read the next row */

    for (n=0; n <= 511 ; n++)      /* average two rows*/
      arf[n] = arf[n] + (float)( archr[n] );

    /* REMOVE LOW FREQ COMPONENT */
    out0 = 0.0 ;    /* don't want an initial spike */;
    in0 = arf[start] ;
    for (n = start   ;   n <= 511 ; n++ )
    {   in1=in0  ;
        out1=out0;
        in0=  arf[n];
        out0= (float)( .8581552 * (in0 - in1)) + (float)(.7304027 * out1 );
        arf[n] = out0;
    }

    /* REMOVE HIGH FREQUENCY COMPONENT */
    out0 = 0.0 ; /* don't want an initial spike */;
    in0 = arf[start] ;
    for (n = start   ;   n <= 511 ; n++ )
    {   out1=out0  ;
        in0=  arf[n];
        out0= (float)( .964326 * in0) + (float)(.035674 * out1 );
        arf[n] = out0;
    }

    /* INVERT, SHIFT, and ADD */
    for ( n = 0 ;   n <= 502 ; n++ )        /*can't grab invalid values >511*/
      arf[n] = arf[n]+arf[n+1]+arf[n+2] - arf[(n+5)]-arf[n+6]-arf[n+7];

    /* FIND BLACKEST PIXEL */
    xmin = 255    ;
    nmin = -1     ;
    for ( n= start ; n <= end ; n++ )
    {   x = arf[n] ;
        for ( ; x < xmin ; )       /* search for blackest picture */
        {   xmin = x ;             /* xmin is blackest level */
            nmin = n ;             /* nmin is pixel number of blackest pixel */

    /* PAINT MARKER ON SCREEN */
    for ( n=start; n <= (end+7) ;n++ )
        archr[n] = 0;
    mv_writerow(0,row,archr) ;
    mv_writecol(0,nmin,archr);

    nmin = m[nmin] ;               /* convert from pixel to voltage */

  return(nmin);
  }

/**************************************************************************/
```

What is claimed is:

1. System for remotely reading out an analog meter having a movable pointer overlying and being mobile over a stationary scale, said pointer being characterized by a first optical reflectivity (R1), and said scale being characterized by a second optical reflectivity (R2), comprising:

A. imaging means for generating an image signal representative of the optical reflectivity of a composite image of said pointer overlying said scale, B. detection means for processing said image signal to generate a pointer position signal representative of the relative position of said pointer with respect to said scale, and wherein said image signal is representative of the optical reflectivity of said composite image along a path of interest across said scale including regions underlying possible positions of said pointer, and wherein detection means includes:

i. means for generating a first reflectivity change signal representative of the change in optical reflectivity between R1 and R2 along said path of interest, ii. means for summing said first reflectivity change signal with a temporally offset inverted form of said first reflectivity change signal, said temporally offset inverted form being temporally offset from said first reflectivity change signal by a time corresponding to the width of said pointer along said path of interest, iii. means for generating said pointer position signal, said pointer position signal corresponding to said sum of first reflectivity change signal and said temporally offset inverted form.

2. A system according to claim 1 wherein said imaging system includes digitizing means for generating a multiple element array of image data corresponding to said image signal, wherein the value of each element of said array represents the optical reflectivity of a correspondingly positioned pixel in said composite image of said pointer overlying said scale.

3. A system according to claim 2 further comprising a look-up table (LUT) memory means for storing output values corresponding to respective values for said pointer position signal, and means responsive to said pointer positioning signal for generating an output signal representative of the output value corresponding to said pointer position signal in said LUT memory means.

4. A system according to claim 2 wherein said digitizing means includes a video camera.

5. System for remotely reading out an analog meter having a movable pointer overlying and being mobile over a stationary scale, said pointer being characterized by a first optical reflectivity (R1), and said scale being characterized by a second optical reflectivity (R2), comprising:

A. imaging means for generating an image signal representative of the optical reflectivity of a composite image of said pointer overlying said scale, B. detection means for processing said image signal to generate a pointer position signal representative of the relative position of said pointer with respect to said scale, wherein said imaging means includes digitizing means for generating a multiple element array of image data corresponding to said image signal, wherein the value of each element of said array represents the optical reflectivity of a correspondingly positioned pixel in said composite image of said pointer overlying said scale, wherein said detection means includes:

means for defining a path of interest across said scale, said path of interest including regions underlying possible positions of said pointer, and pointer signal means for processing image data corresponding to pixels along said path of interest to generate said pointer position signal, wherein said pointer signal means includes:

i. means for generating a first digital pixel signal representative of the optical reflectivity of pixels along said path of interest, said first digital signal having a first digital value for pixels having reflectivity R1 and a second digital value for pixels having reflectivity R2, ii. means for generating a second digital pixel signal representative of a temporally offset inverse of said first digital pixel signal, and said second digital pixel signal being temporally offset from said first digital pixel signal by a time corresponding to the width of said pointer along said path of interest, iii. means responsive to said first and second digital pixel signals for generating said pointer signal, said pointer signal corresponding to the addition of said first and second binary pixel signals.

* * * * *